US010530163B2

(12) United States Patent
Rodriguez et al.

(10) Patent No.: US 10,530,163 B2
(45) Date of Patent: Jan. 7, 2020

(54) MICRO GRID CONTROL SYSTEM

(71) Applicants: Rolls-Royce Corporation, Indianapolis, IN (US); Rolls-Royce North American Technologies Inc., Indianapolis, IN (US)

(72) Inventors: Rigoberto Jorge Rodriguez, Avon, IN (US); Robert J Zeller, Noblesville, IN (US); Richard Joseph Skertic, Carmel, IN (US); Michael P Dougherty, Indianapolis, IN (US); Curtis Harvey Cline, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 274 days.

(21) Appl. No.: 15/470,701

(22) Filed: Mar. 27, 2017

(65) Prior Publication Data
US 2018/0269689 A1 Sep. 20, 2018

Related U.S. Application Data

(63) Continuation of application No. 15/462,640, filed on Mar. 17, 2017, now abandoned.

(51) Int. Cl.
*H02J 3/46* (2006.01)
*H02J 3/38* (2006.01)
(Continued)

(52) U.S. Cl.
CPC .............. *H02J 3/46* (2013.01); *G05B 15/02* (2013.01); *G05F 1/67* (2013.01); *H02J 3/382* (2013.01); *H02J 4/00* (2013.01); *H02J 9/061* (2013.01)

(58) Field of Classification Search
CPC ... H02J 3/46; H02J 3/382; H02J 9/061; G05F 1/67; G05B 15/02
See application file for complete search history.

(56) References Cited

U.S. PATENT DOCUMENTS

| 9,923,372 | B2 * | 3/2018 | Ishigaki | .................... H02J 3/18 |
| 2005/0028017 | A1 * | 2/2005 | Janakiraman | ........... G06F 1/263 |
| | | | | 713/340 |

(Continued)

OTHER PUBLICATIONS

Extended European Search Report, dated Jul. 30, 2018, pp. 1-9, issued in European Patent Application No. 18158284.2, European Patent Office, Munich, Germany.

*Primary Examiner* — Vincent H Tran
(74) *Attorney, Agent, or Firm* — Brinks Gilson & Lione

(57) ABSTRACT

A micro grid power control system may control a plurality of different sources of electrical energy, such as generators, renewable energy sources, and stored energy sources. The micro grid power control system may include hierarchical levels of control. At a system level, the micro grid power control system may include a system controller configured to selectively allocate the sources and centrally control electrical distribution of electric power within the micro grid based on system conditions to optimize system operation. Optimization of system operation may be dynamically varied by the system controller based on priorities and modeling of system operation. At a source level, each of the sources may include a source controller configured to optimize generation of electrical energy of the respective source. Optimization of a source with a respective source controller may be based on a source objective independently associated with each of the sources and source modeling.

19 Claims, 6 Drawing Sheets

(51) Int. Cl.
*H02J 4/00* (2006.01)
*G05F 1/67* (2006.01)
*G05B 15/02* (2006.01)
*H02J 9/06* (2006.01)

(56) References Cited

U.S. PATENT DOCUMENTS

| | | | |
|---|---|---|---|
| 2011/0115295 A1* | 5/2011 | Moon | H02J 3/32 307/65 |
| 2011/0307113 A1* | 12/2011 | Kumar | B60M 3/00 700/291 |
| 2012/0176098 A1* | 7/2012 | Greening | G06F 1/189 320/136 |
| 2012/0319657 A1* | 12/2012 | Ke | H02J 7/0021 320/134 |
| 2014/0049117 A1* | 2/2014 | Rahman | H02J 4/00 307/82 |
| 2014/0200723 A1 | 7/2014 | Roy et al. | |
| 2014/0277599 A1 | 9/2014 | Pande et al. | |
| 2014/0306525 A1 | 10/2014 | Greer et al. | |
| 2016/0322828 A1* | 11/2016 | Vogel | H02J 7/0068 |
| 2018/0119628 A1 | 5/2018 | Zeller et al. | |
| 2018/0119629 A1 | 5/2018 | Cline et al. | |
| 2018/0173171 A1* | 6/2018 | Lin | G05B 13/021 |

* cited by examiner

MICRO GRID CONTROL SYSTEM

CROSS-REFERENCE TO RELATED APPLICATIONS

This application is a continuation application of U.S. patent application Ser. No. 15/462,640, "MICRO GRID CONTROL SYSTEM" filed Mar. 17, 2017, the entire contents of which are incorporated by reference.

TECHNICAL FIELD

This disclosure relates to power systems and, in particular, to control of micro grid power systems.

BACKGROUND

Power distribution systems typically include a source of electrical power and electrical conductors forming a grid to carry the electric power to loads. Usually, such grids are part of a large public electric utility grid and may be operated in synchronism with other large electric utility grids. Independent power generators typically connect to the grid of the utility by synchronizing to already operating generators in the grid to become part of the power generation on the grid.

Power generated on a grid is supplied to the load on the grid. Typically, power generated by an independent power generator is supplemental to power supplied to the grid from the larger electric utility. Thus, in many instances, the independent power generator is simply an extension of the larger electric utility power generation without the need to provide management or control by the utility of the generation by the independent power producer. A micro grid may not be connected with a larger utility grid, but may still include generators and a load. Management and control of a micro grid can involve a host of complex issues not present or addressed with electric utility grid operation.

SUMMARY

An example of a micro grid control system includes sources of electrical energy such as a generator, a renewable energy source and a stored energy source. Each of the sources of electrical energy includes a source controller configured to optimize generation of electrical energy according to a source objective independently associated with each of the sources. The system may also include a central power controller configured to receive operational parameters from each of the sources and selectively and dynamically provide a power demand signal and a mode signal to each of the sources independently. The central power controller is further configured to provide electrical energy to a micro grid from any two or more of the sources according to a system objective. The two or more sources operate in accordance with their respective source objective, and based on the power demand signal and the mode signal, supply electrical power to the system power controller for allocation to the micro grid.

Another example of a micro grid control system includes a central power controller configured to control distribution of electrical power to a micro grid. The system may also include source controllers in communication with the central power controller. Each of the source controllers is configured to independently control a respective source of electrical power and to optimize operation of the respective source. The system may further include a central power distribution device configured to selectively provide electrical energy to the micro grid from sources of electrical power in accordance with control signals provided by the central power controller. The central power controller is configured to perform model based status assessments of the sources of electrical power based on status information received from the source controllers and generate a power demand to each of the source controllers in accordance with optimization of distribution of electrical power to the micro grid.

Another example is a method of operating a micro grid control system. The method may include receiving, at a central power controller a system demand input; sensing, with the central power controller, a load of a micro grid; determining a mode of operation of the micro grid control system; and performing modeling of operation of sources included in the micro grid power system based on the system demand input, the load, and the mode of operation. The method may also include generating a demand signal for each of the sources. The demand signal may be generated independently and autonomously for each of the sources based on the modeling and an objective function of the micro grid to optimize electric power output to the micro grid from at least two of the sources. In addition, the method may include dynamically transmitting a mode signal indicative of the mode of operation and demand signal to each of the respective sources; and independently optimizing, with a source controller of each of the sources, operation of a respective source to generate electric power in response to the demand signal and according to the mode of operation of the micro grid. The method may also include controlling a central power distribution device to selectively allocate electric power from the sources to the micro grid to satisfy the load.

Other systems, methods, features and advantages will be, or will become, apparent to one with skill in the art upon examination of the following figures and detailed description. It is intended that all such additional systems, methods, features and advantages be included within this description, be within the scope of the invention, and the following claims.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
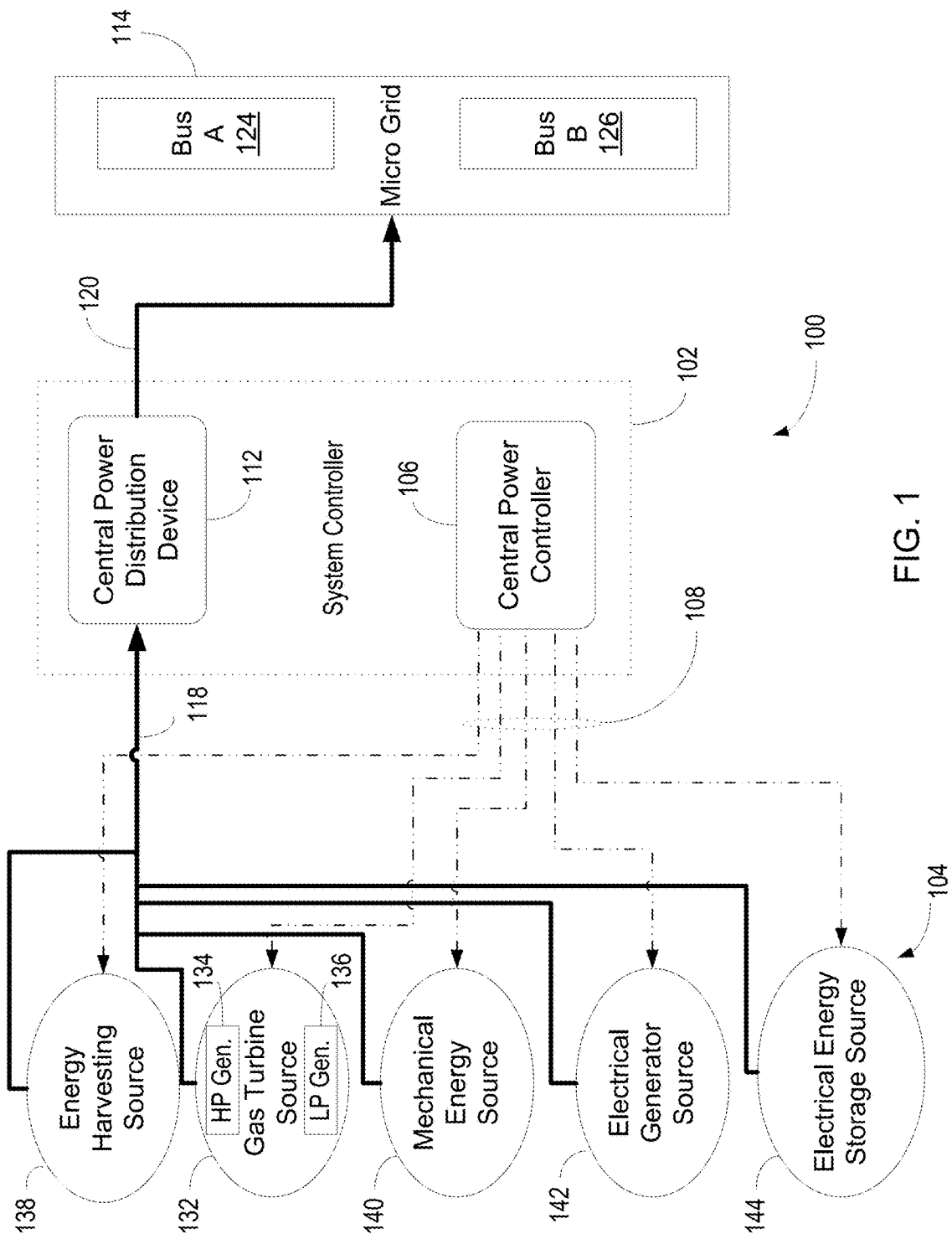
FIG. 1 is a block diagram of an example micro grid power system.

A micro grid power system may include a system controller and a number of source controllers configured in a hierarchal structure. The system controller may manage and control the overall function of the micro grid power system. The source controllers, which may independently communicate with the system controller, may perform independent control of respective sources in accordance with management control signals provided by a central power controller included in the system controller. The central power controller may separately and independently communicate with each of the source controllers to affect how each of the source controllers manage power output and control of different respective independent sources of electric power resident in the micro grid. Management and control by the central power controller may involve use of model based control and model based estimators for the micro grid power system to manage the multiple sources of electrical energy generation and storage. The multiple sources of electrical energy generation and storage may selectively provide power to a central power distribution device for the micro grid, which is included in the system controller. The central power distribution device may be controlled by the central power controller.

The central power controller may perform objective functions and provide independent gradient demand signals to the source controllers based on the most advantageous/efficient method of supplying electrical energy for the micro grid from multiple of the sources of energy. The multiple sources of energy could be devices such as electrical generators; electrical energy storage devices, such as battery systems or super-capacitors; mechanical energy storage devices such as one or more flywheels, and/or energy harvesting devices such as solar and wind-power devices. The central power controller may perform real-time model based demand management of these devices based on modeled parameters of the micro grid system. In other words, a model may be used by the central power controller to estimate the resulting interaction of the energy draw on the sources and provide for the most efficient dispatch and management of the sources of electrical energy. The modeled parameters may be modeled in real time to represent parameters such as device parameters of the different sources of energy that could not easily be measured without the use of a real-time model. In addition, estimated cooperative performance of the different sources of energy may be modeled by the central power controller to determine a demand allocation to the sources. The central power controller may also determine the relative health and efficiency of these source devices and factor that into the demand allocation decision.

The central distribution device may be executed by the central power controller based on the objective functions and gradients to make intelligent decisions regarding where to draw the electrical energy to satisfy the dynamic demands of the micro grid. These objective functions can include efficiency, economic and device based algorithms to facilitate the autonomous decision making capability of the central power controller. The system objective function may then dictate the most advantageous and optimized combination of sources to provide the electrical power to meet the steady state and dynamic load demands of the micro grid. The micro grid may be a land based electrical grid, a mobile land based electrical grid, a marine vessel electrical grid, or even an aerospace electrical grid, such as in an airplane. Furthermore, the central power controller may determine, based on economics and efficiency, opportune times to recharge sources of energy, such as energy storage devices included in the micro grid system.

FIG. 1 is a block diagram of an example micro grid power system 100 that includes a system controller 102 and a number of different independent sources of electrical energy 104 such as generators, energy storage devices, and the like.

The system controller 102 may include a central power controller 106 capable of outputting management control signals 108 to the sources of electrical energy 104. The management control signals 108 may be output independently and autonomously to the different sources of electrical energy 104. The central power controller 106 may be hardware in the form of circuitry and/or logic configured to perform the functionality described herein. The central power controller 106 may also include memory or other form(s) of non-transitory information storage hardware.

The system controller 102 may also include a central power distribution device 112. The central power distribution device 112 may be a switching device configured to independently switch electric power supplied from the sources of electrical energy 104 to a micro grid 114. The central power distribution device 112 may, for example, include an electrically operated circuit breaker for each of the sources of electrical power 104. Electric power supply lines 118 from respective sources of electrical energy 104 may terminate at respective circuit breakers in the central power distribution device 112, and a power output line 120, such as from the circuit breakers, may supply electrical power from the central power distribution device 112 to the micro grid 114. Although illustrated as single lines, power supply line 118 and the power output line 120 may be one or more cables or power busses. For example, the power output line 120 may be one or more busses being fed by the circuit breakers, or may be individual power supply lines from respective circuit breakers.

The micro grid 114 may be any form of power distribution system, which may include conductors, switches, transformers and other power distribution and switching equipment configured to enable the supply of electrical power from the sources 104 to loads included in the micro grid 114. As used herein, the term "micro grid" is defined as a stand-alone isolated power distribution system in which loads within the power distribution system are only supplied power from the sources of electrical power 104 within the system. Thus, a micro grid 114 is not coupled to or synchronized with a commercial public utility grid distributing power to residential and industrial companies for a fee.

The power output line 120 may feed a number of different power busses, such as the example Bus A 124 and Bus B 126. In an example configuration, Bus A 124 and Bus B 126 may supply different loads, and the circuit breakers in the central power distribution device 112 may be selectively opened and closed to transfer electrical power from the sources 104 to Bus A 124 or Bus B 126 in accordance with the respective load. In this way, as the load on Bus A 124 and/or Bus B 126 changes, the circuit breakers can be dynamically opened and closed to adjust the supply of electrical power to Bus A 124 and Bus B 126. In addition, as the electrical power output by the sources 104 varies, the circuit breakers may be dynamically switched to maintain an adequate supply of electrical power to the loads on the respective A and B busses 124 and 126.

In an example application, the micro grid power system 100 may be deployed in an aircraft. In this example, sources 104 within the micro grid power system may include at least one gas turbine engine 132 that includes an HP generator (or first electrical generator) 134 driven by a high pressure spool of the gas turbine engine 132, and an LP generator (or second generator) 136 driven by a low pressure spool of the gas turbine engine 132. In addition, the sources 104 may include an energy harvesting source 138, such as a solar panel or wind turbine, a mechanical energy source 140, such as a mechanical flywheel, an electrical generator source 142, such as a compressor driven electrical generator, and a electrical energy storage source 144, such as a storage battery or super capacitors. In other examples, other sources may be included and/or some of the illustrated sources may be omitted. In addition, in other examples, the micro grid power system 100 may be deployed in other applications, such as a ship, a vehicle, a weapon system, or any other application where a temporary or permanent power system may be operated independently and isolated from external sources of electrical power, such as a commercial electric utility.

Figure 2:
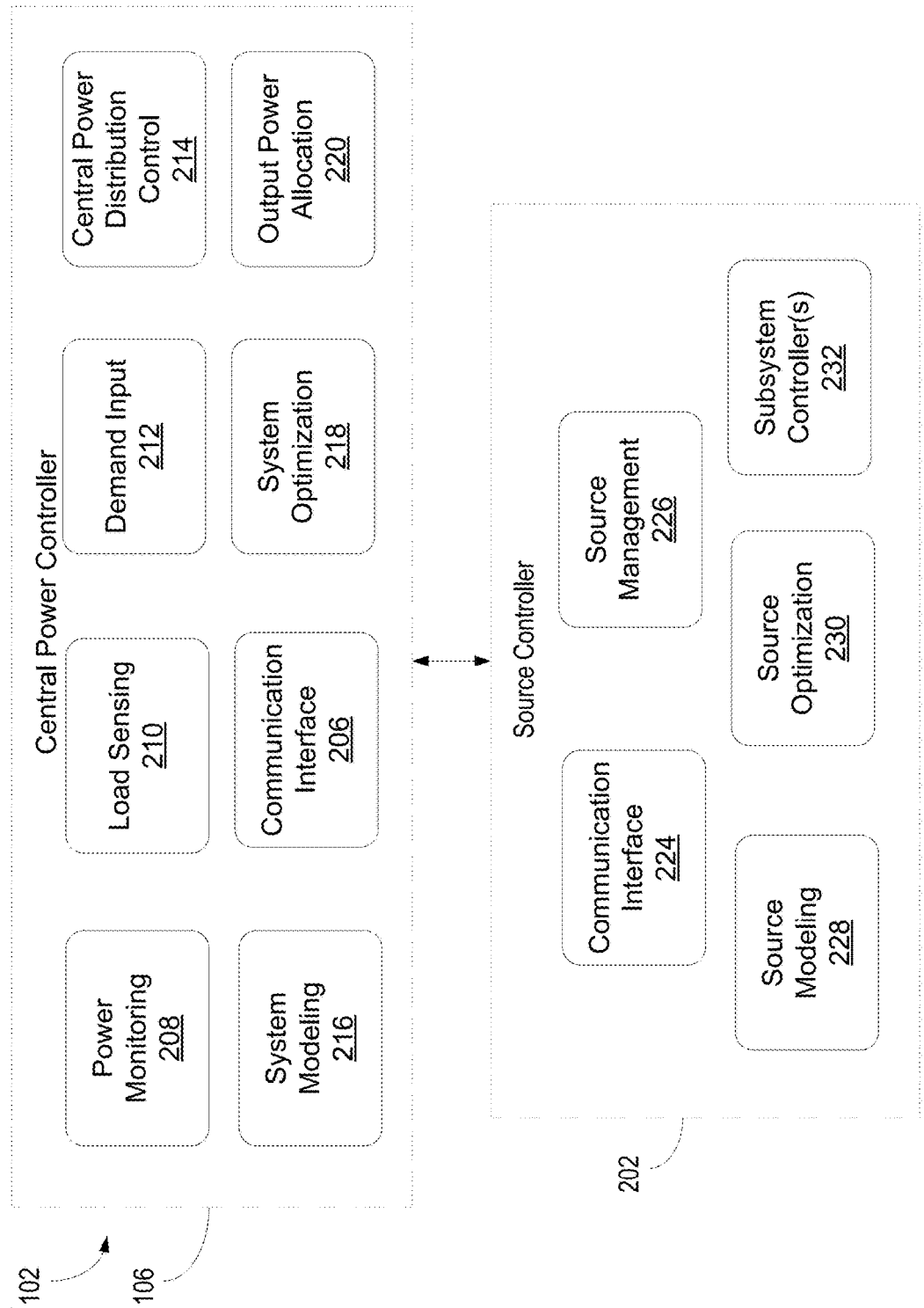
FIG. 2 illustrates a block diagram of a portion of an example micro grid power system that includes a central power controller and source controller.

FIG. 2 is a block diagram of a portion of a micro grid power system 100 illustrating an example of a portion of the system controller 102 and a source controller 202. Each of the sources 104 (FIG. 1) may include a source controller 202 which receives the management control signals 108 (FIG. 1) from the central power controller 106. Although only a single source controller 202 is illustrated, it should be understood that the micro grid power system 100 may include a source controller 202 for each source of electrical power. The central power controller 106 may be circuitry that includes hardware and/or logic executed with a processor. The circuitry may include a communication interface 206, which may perform two-way communication, including communication of management control signals 108 (FIG. 1) with each of the source controllers 202. The communication interface 206 may provide a wired and/or a wireless communication interface, and may include a network interface, a point-to-point interface, a communication bus interface, or any other form of software/firmware and/or hardware capable of providing a communication protocol or pathway between devices.

The system controller 102 may also include power monitoring circuitry 208, load sensing circuitry 210, demand input circuitry 212, central power distribution control circuitry 214, system modeling circuitry 216, system optimization circuitry 218 and output power allocation circuitry 220. In other examples, additional or less circuitry may be illustrated to perform the functionality described herein. The circuitry is hardware that may include at least part of a processor and a memory storing code executable by the processor and other information used or created by the system.

The power monitoring circuitry 208 may monitor actual power output from each of the sources 104. The actual power outputs from each source may be provided as parameters from the respective source controllers 202, or may be individually sensed, such as by sensors, and provided to the power monitoring circuitry 208. The load sensing circuitry 210 may sense the actual load in the micro grid power system. Alternatively, or in addition, the load sensing circuitry 210 may use a projected load. The projected load may be based on modeling, or may be a predetermined value or values, such as a user entered value(s). The projected load may be dynamically varying during a time period, or may be static.

The demand input circuitry 212 may indicate a demand input of micro grid power system. The demand input may be, for example, a user input indicating how the electrical power from the sources is being used, or is about to be used. For example, in an aircraft, the demand input may indicate the aircraft is taking off, or in the example of a vehicle that the vehicle is accelerating, or in another system that maximum power output is desired, or that the system is in a quiescent period with significantly lower power output necessary. In another example, a demand input may be associated with a particular mode, such as a demand associated with a startup mode or a shutdown mode. In still other examples, a demand input may be associated with another form of mode for the particular system or device, such as a battle-override mode for an aircraft, in which continued operation is critical, even if it means 'burning up' equipment or running inefficiently in order to keep the aircraft in the air. In yet other examples, a demand input may be due to criticality of the power being supplied (e.g. propulsive power for hover for an aircraft), or for a limp-home scenario, where equipment is damaged but the system or device needs capability to continue partial function, such as an aircraft returning to base, or a space craft maintaining heat and oxygen.

The central power controller 106 may also generate the management control signals 108 using the central power distribution control circuitry 214, system modeling circuitry 216, system optimization circuitry 218 and output power allocation circuitry 220. The central power distribution control circuitry 214 may monitor and control the central power distribution device 112 (FIG. 1) to direct the selective provision of electrical power from the sources to the micro grid 114 (FIG. 1). Thus, the central power distribution control circuitry 214 may direct the circuit breakers to open and close to, for example, allocate the sources to Bus A and Bus B, or to stop or start the flow of power from a source to the micro grid.

The system modeling circuitry 216 may be used to dynamically model in real time parameters within the micro grid power system that are not being measured based on available measured or known parameters in the micro grid system. For example, a measured parameter, such as a voltage level of a source such as a storage battery may be used to model or estimate a remaining amount of output power available from the storage battery to supply the micro grid, and an amount of energy and time needed to recharge the storage battery to full output. Estimation and modeling of parameters may be similar to the functionality and techniques described in U.S. patent application Ser. No. 15/336,534 filed on Oct. 27, 2016, entitled "Adaptive Controller," which is herein entirely incorporated by reference.

In addition, the system modeling circuitry 216 may perform dynamic modeling of the sources in the micro grid control system to determine a model reference state trajectory for each of the sources. For any of the sources, the system modeling circuitry 216 may calculate a model based reference state estimate of a trajectory for a respective source based on modeled and actual operational parameters of that particular source. In addition, the system modeling circuitry 216 may obtain an actual operational trajectory of the respective source. Determination of the reference state trajectory and the actual operational trajectory may be similar to the functionality and techniques described in U.S. patent application Ser. No. 15/336,546 filed on Oct. 27, 2016, entitled "Model Reference Adaptive Controller," which is herein entirely incorporated by reference.

In addition to a source specific modeling, the system modeling circuitry 216 may perform dynamic parameter modeling across different sources by leveraging real-time parameters received from multiple sources. Further, the system modeling circuitry 216 may generate a model reference state estimate of the trajectory of different sources based on modeled interactive behavior of the different sources. For example, the system modeling circuitry 216 may perform a number of different modeling exercises with different combinations of the sources operating at different levels of electrical power output to calculate model based reference state trajectories for the various sources under various operating conditions or scenarios.

The system optimization circuitry 218 may optimize operation of the sources in the micro grid system based on a system objective function established for the system. System objective functions may involve, for example, 1) economic considerations; 2) survivability considerations; 3) maintenance considerations; and/or 4) operational considerations. Examples of system objective functions include an efficiency objective function to dynamically arrange output of electrical power from sources to most efficiently supply the load of the micro grid power system; a situational objective function to selectively supply appropriate and adequate power from two or more sources in a given situation, such as during a situation requiring peak power, such as take-off of an aircraft, or discharge of a weapon; and/or an operational objective function, such as maintaining a predetermined micro grid voltage. In addition, inputs to the central power controller 106, such as actual output power of the sources from the power monitoring circuitry 208, projected or actual load from the load sensing circuitry 210, or a demand input from the demand input circuitry 212 may invoke input system objective functions.

Once a system objective function is established, the system optimization circuitry 218 may use information from the power monitoring circuitry 208, load sensing circuitry 210, demand input circuitry 212, and system modeling circuitry 216 to optimize system operation for the established system objective function. The power monitoring may provide the actual output power of the sources as a feedback to the system optimization circuitry 218. In addition, the load sensing information may be used to dynamically match the sources to the actual load in the micro grid power system. Demand inputs may dictate the objective function, or operate as a weighting to modify an objective function. The modeling may provide an estimate of operation of the sources to meet a load and/or demand input. In addition, the modeling may be used to develop an indication of interaction between the various sources, such as the impact on a system objective function when sources are switched on and off, or ramped to higher or lower power output.

To fulfill the objective function, the system optimization circuitry 218 may selectively output demand signals to respective source controllers 202 and correspondingly control the central power distribution device 112 via the central power distribution control circuitry 214. In addition, the information received from the source controllers 202 via the communication interface 206 may be used by the system optimization circuitry 218.

Figure 3:
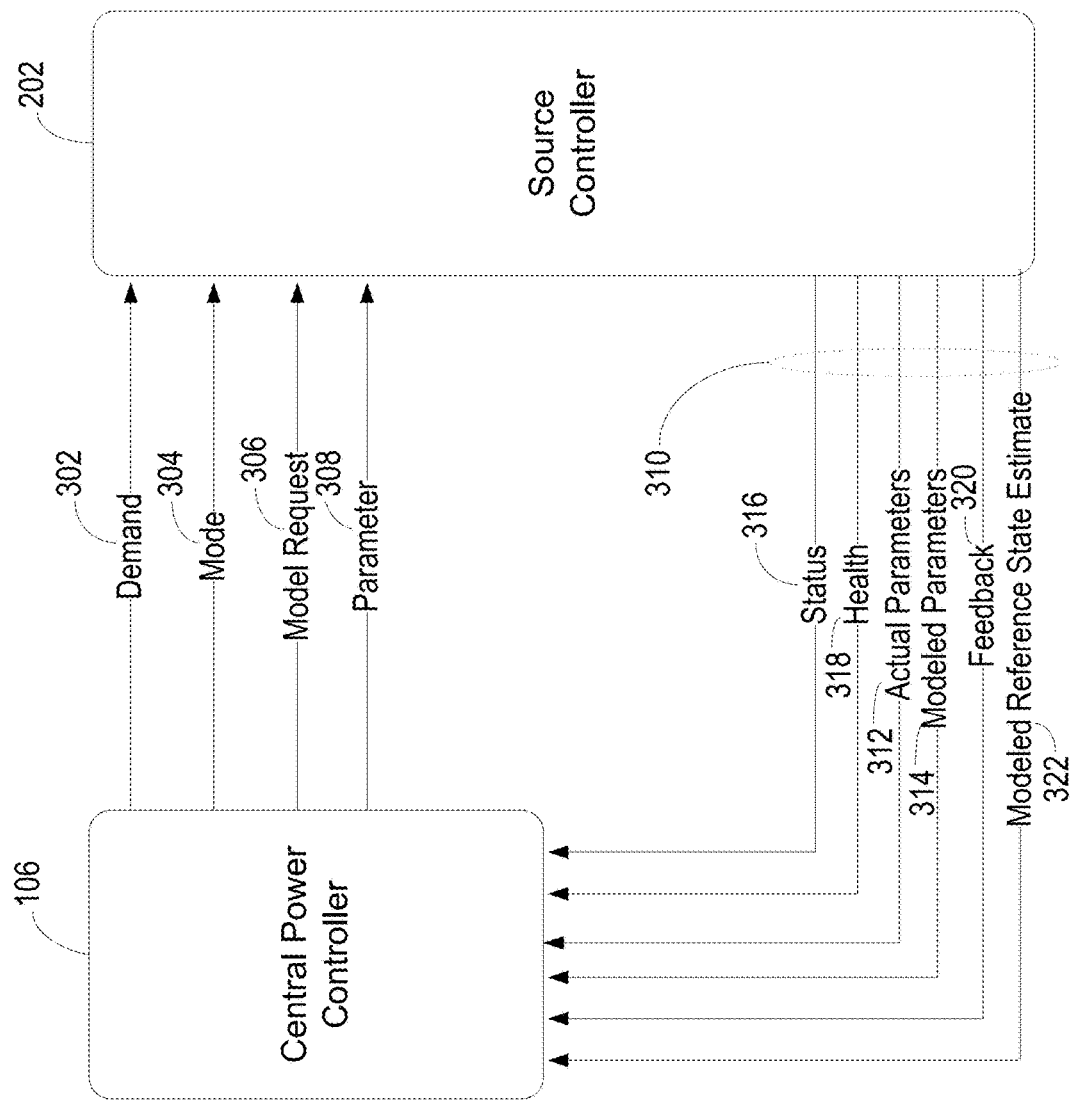
FIG. 3 is a block diagram illustrating example communication paths between a central power controller and a source controller.

FIG. 3 is a block diagram illustrating an example of information communicated between the central power controller 106 and the source controllers 202. Although only one source controller 202 is illustrated, the central power controller 106 may independently and autonomously communicate with any number of different source controllers 202. Signals may be output and received by the central power controller 106 via the communication interface circuitry 206.

Signals output by the central power controller 106 include a demand signal 302. The demand signal 302 may be a request to a source controller 202 to provide a requested amount of electrical power output. The demand signal 302 may be generated by the system optimization circuitry 218 based on the system objective function. The demand signal 302 may be generated and provided as a unitless gradient signal. For example, the gradient signal may be a percentage of full rated output of the respective source, a value representative of an operational cost of the respective source, such as a cost per KWH (kilowatt hour), a predetermined range of values, a desired grid voltage or any other form of signal that indicates to the respective source controller 202 a requested level of output power from the respective source. The term "signal" should not be construed in a limiting sense, but rather as a transfer of information, which may involve one or more values, parameters or indications.

The central power controller 106 may also output a mode signal 304. The mode signal 304 may provide an indication of the system objective function under which the system optimization circuitry 218 is operating. In addition, or alternatively, the mode signal 304 may provide a top level control or primary objective under which the central power controller 106 is operating. For example, if the system objective function is based on economic considerations, such as equipment longevity, the primary objective to the source controller 202 may be operation of the source in a range of between 60% and 80% of full rated output to minimize wear. If, on the other hand, the economic considerations are resource costs, such as fuel costs, the primary objective may be to operate the source at maximum fuel efficiency.

A model request signal 306 may be output by the central power controller 106 to request a respective source controller 202 to create a respective reference model state for a given operational scenario, such as a particular demand gradient, or range of demand gradients, or an anticipated future state, such as a particular allocation of sources providing electrical energy to the micro grid. Once received, the reference model state may be used by the central power controller 106 in addition to the actual model state of the respective source to, for example, adjust the demand signal 302 output to the particular source. In addition, or alternatively, the system optimization circuitry 218 may use the reference model state in associating with the system modeling 216 to model different electrical power supply scenarios using the various sources. Thus, for example, a reference model state generated by a source controller 202 may indicate that in a modeled state of a 10% increased demand above the current demand a drop in efficiency of 25% and an acceleration by 5% of decreasing life expectancy by the source is expected. The system optimization circuit 218 may then opt to energize or ramp a different source due to the modeled state of the different source having a lesser drop in efficiency and life expectancy.

A parameter signal 308 may be any number of signals representing operational or modeled parameter(s) available at the central power controller 106. Thus, the central power controller 106 may dynamically share operational or modeled parameters among different source controllers 202 thereby eliminating the need for additional sensors or modeling of duplicative information in the system. In addition, the modeling circuitry may use actual parameters 312 and/or modeled parameters 314 received from different source controllers 202 to model additional parameters related to one or more of the sources.

Each of the source controllers 202 may output status information 310 to the central power controller 106. The status information 310 may be output on a predetermined schedule, in response to a change in the operational conditions of the respective source, or upon request from the central power controller 106. In addition to actual parameter signals 312 and modeled parameter signals 314 received from one or more respective source controllers 202, the status information 310 may also include a status signal 318 from each of the source controllers 202. The status signal 316 may be one or more signals providing information regarding the respective source, such as operational status of the source, e.g. fully functional, only 80% of rated output power available, in warm up mode, ramping to higher or lower power output, etc. In addition, or alternatively, the status signal 318 may provide an indication of the actual operation of the source based on the demand signal 302 and mode signal 304 being provided by the central power controller 106, such as an indication of high efficiency or low efficiency operation. Further, the status signal 318 may provide an operational state of a respective source, such as an indication of a malfunctioning part within a source, fully charged/discharged indication for an electrical or mechanical energy storage device, or a constraint on operation such as a high or low speed, temperature, or pressure threshold.

The source controller 202 may also provide a health signal 318 to the central power controller 106. The health signal 318 may provide, for example, an estimate of the life expectancy of the source based on the actual operating conditions. A feedback signal 320 may also be provided indicating the actual electrical power being output by the respective source in response to the demand signal 302 received.

The source controllers 202 may also selectively provide a model reference state estimate signal 322 representing an estimated trajectory of the source. The model reference state estimate signal 322 may be provided in response to a model request signal 306 from the central power controller 106. Alternatively, or in addition, the model based reference state estimate signal 322 may be generated by the respective source controller 202 in response to an event, such as a change in status of the source, receipt of a change in the demand signal 302 and/or mode signal 304, change in an actual or modeled parameter, or some other event that effects operation of the source. The model reference signal 322 may be an estimate of performance of the source under existing or possible future operating conditions. In addition, or alternatively, the model reference signal 322 may be an estimated optimal operation indication providing the central power controller 106 with an indication that is comparable to other sources. For example, the model reference signal 322 may be a unitless gradient signal.

Figure 4:
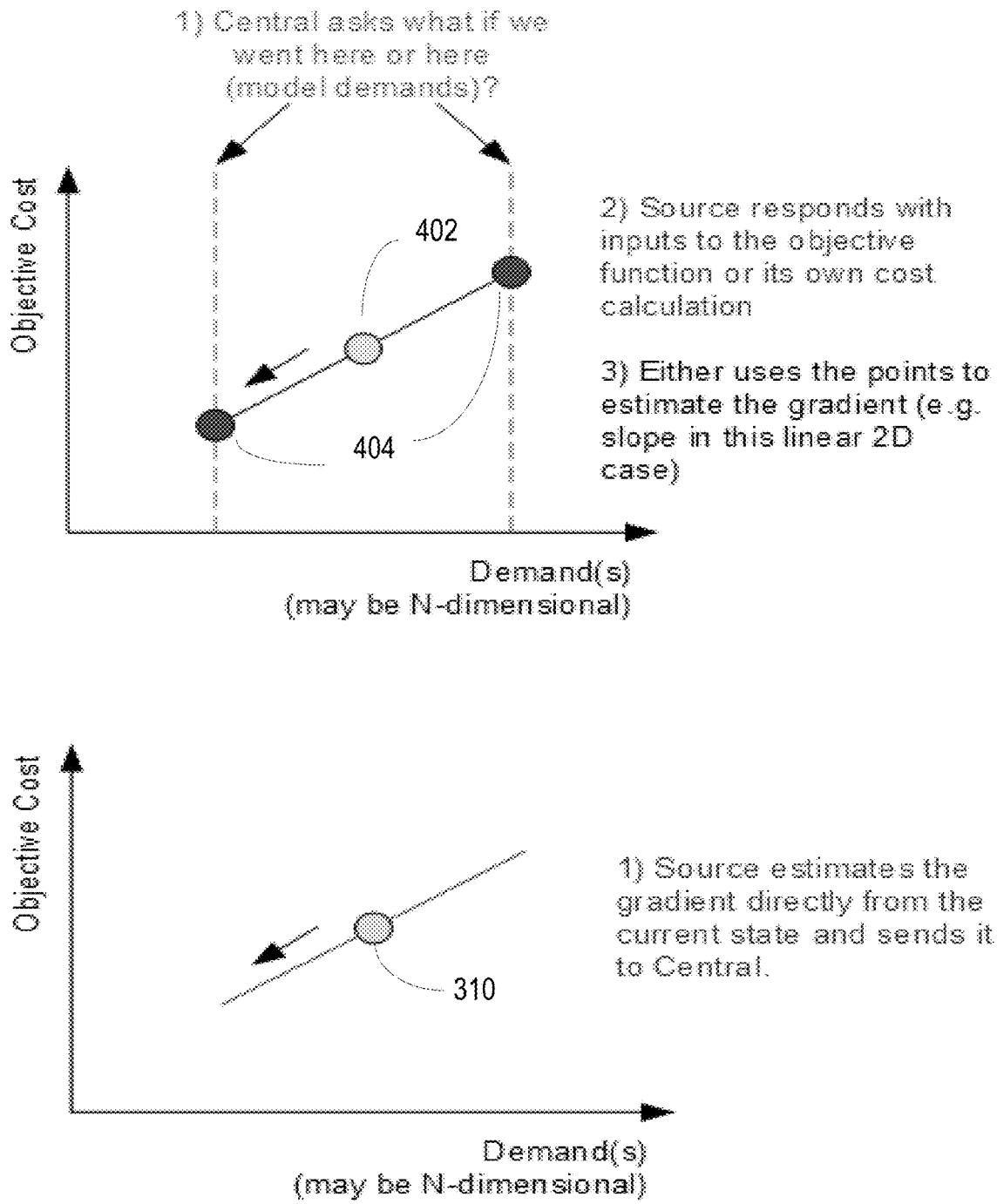
FIG. 4 is an example illustrating calculation of a gradient by a source controller.

FIG. 4 is an example illustrating calculation of a gradient by a source controller 202. For example, the gradient signal may be a percentage of full rated output of the respective source, a value representative of an operational cost of the respective source, such as a cost per KWH (kilowatt hour), a predetermined range of values, or any other form of signal that indicates to the respective source controller 202 a requested level of output power from the respective source. Instead of the central power controller 106 having to ask for hypothetical future states, the respective source controller 202 may calculate the gradient of the objective function (with respect to current and hypothetical demand) on its own, using current conditions. In FIG. 4, a current state 402 is provided. The source controller 202 may be provide two model demands 404 from the central power controller 106 in a model request signal 306. The source controller 202 may estimate future operating conditions based on modeling. The modeling may provide an estimate of the gradient based on the two hypothetical model demands, or based on estimation directly from current operating state of the source as illustrated in FIG. 4. The information provided in model reference signal 322 may be based on actual or hypothetical parameters provided by the central power controller 106, such as a demand signal 302, a mode signal 304, parameter signals 308, operation of other sources, constraints or operating conditions placed upon the respective source, or any other parameters affecting performance of the source.

Referring again to FIGS. 2 and 3, the functionality of the source controllers 202 may include communication interface circuitry 224, source management circuitry 226, source modeling circuitry 228, source optimizer circuitry 230, source priority circuitry 232, and one or more subsystem controllers 234. In other examples, greater or fewer numbers of circuitry may be used to describe the functionality of the source controllers described herein. The source controller 202 may be circuitry that includes hardware and/or logic executed with a processor.

The communication interface 224 may provide a wired and/or a wireless communication interface, and may include a network interface, a point-to-point interface, a communication bus interface, or any other form of software/firmware and/or hardware capable of providing a communication protocol for communication with the communication interface 206. Source management circuitry 226 may control and manage the overall operation of the respective source. For example, the source management circuitry for a gas turbine engine source may be involved with management and control of the combustion process in the jet engine, generation of electrical power with the HP generator and the LP generator, and other functionality of the gas turbine. The source management circuitry 226 may also operate the source in accordance with the demand signal 302 and the mode signal 304. In addition, the source management circuitry 226 may receive and react to the model request signal 306 provided from the central power controller 106 in conjunction with the source modeling circuitry 228.

The source modeling circuitry 228 may perform dynamic parameter modeling, to determine parameters not being sensed, using parameters that are being sensed. In addition, the source modeling circuitry 228 may generate a model reference state trajectory of projected operation of the source. In addition, the source modeling circuitry 228 may build a real time model estimate of the status of the source using measured and derived parameters. The determination of the status may include generation of the status signal 316 provided to the central power controller 106. In addition, the source modeling circuitry 228 may determine the health of the source, such as remaining useful life, and/or operating condition, and provide the health signal 318 to the central power controller 106.

The source optimization circuitry 230 may optimize the operation of the source based on an objective function such as energy economy, longevity of life, maximum power output, and other objectives for operating the source. Optimization by the source optimization circuitry 230 may be based on measured parameters, as well as modeled parameters and the model reference state trajectory provided by the source modeling circuitry 228. In addition, demand signals 302 and mode signals 304 received by respective source controllers 202 may be used by the source optimization circuitry 230. Thus, the source optimization circuitry 230 may operate the source for economic considerations, such as longevity or operating cost, survivability and/or operational considerations, such as health, actual vs demanded output, and the model reference state trajectory based on a demand signal 302. In an example of a gas turbine source, the source optimization circuitry 230 may apportion the electrical power output provided from the gas turbine between multiple generators, such as an HP generator and an LP generator based on an objective function, such as coordinating a service time so that the HP generator and the LP generator reach a service time at about the same time. The projections of when service times are reached may be based on actual operation and modeling with the source modeling circuitry. An example of similar optimization of the operation of a source is described in U.S. Patent Application No. 62/333,730 filed May 9, 2016, which is herein incorporated by reference in its entirety.

In addition, the source optimization circuitry 230 may weight or adjust the objective function under which the source is being operated based on a mode signal 304 indicative of a mode of the micro grid power system. For example, when the mode of the micro grid power system is full power output, an operating cost objective function for a particular source may have a reduced weighting. In another example, where the mode of the micro grid power system is in a standby mode, the objective function of a source that is an energy storage device may be weighted for efficient recharge, and the object function of an electrical generator source may be weighted for maximum power output to supply recharge energy.

The subsystem controller(s) circuitry 232 may include one or more controllers operating respective parts of the source. For example, subsystem controller circuitry 232 may operate temperature and pressure control loops within a gas turbine. Demand signals and mode signals received by the source controller 202 may be selectively supplied as feed forward weightings to the subsystem controller(s) circuitry 232. Thus, for example, if the demand signal is requesting rated output power of the source, and the mode is full power mode, the subsystem controller(s) circuitry 232 may be weighted to minimize economic efficiency, such as rate of fuel consumption. In another example, a source such as an electrical energy storage source may be weighted to continue to provide full output power even though remaining stored energy is reaching a predetermined low threshold where the subcontroller circuitry would begin to throttle down the electrical energy output of the source due to the mode being a full power mode.

Figure 5:
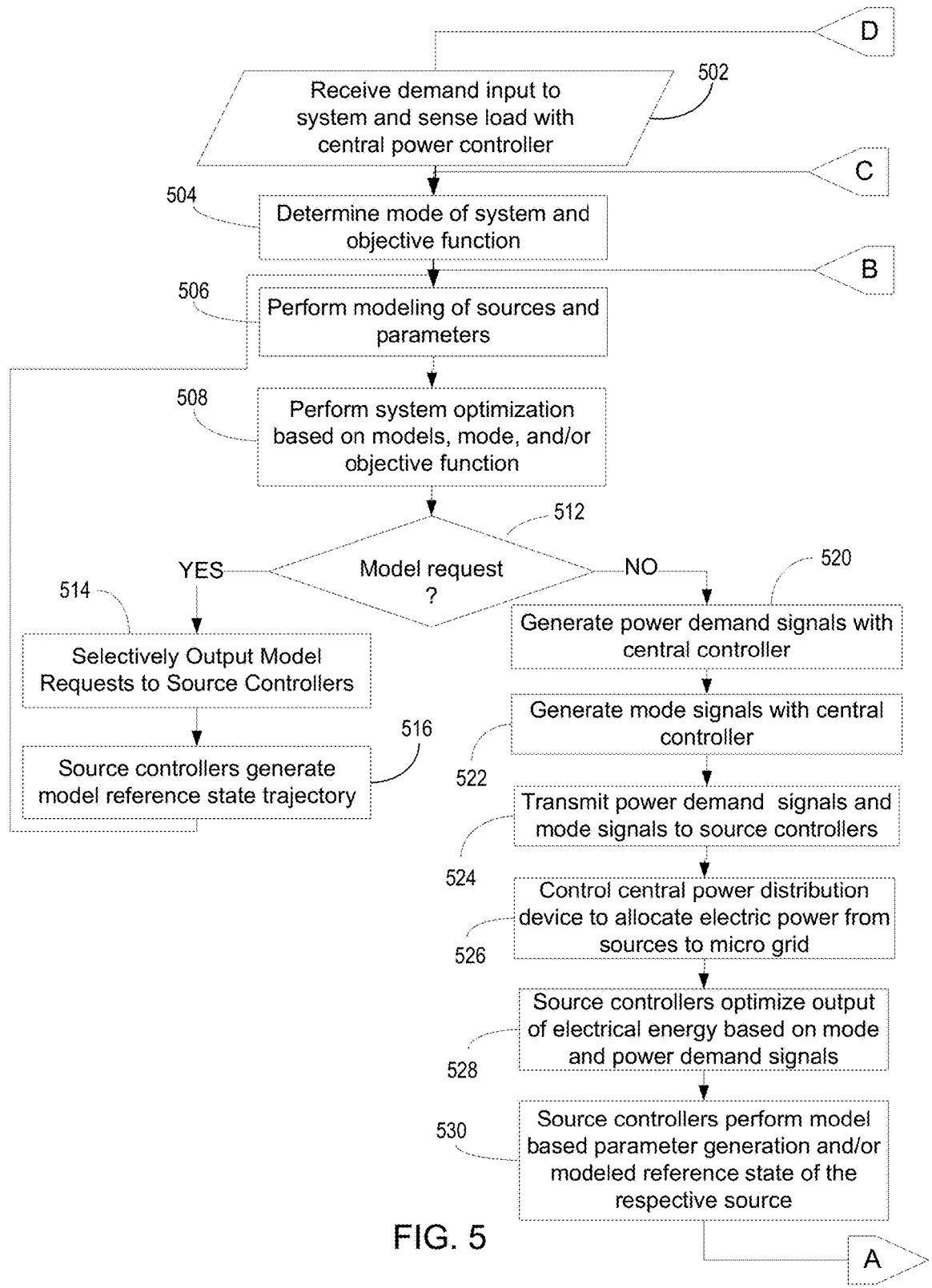
FIG. 5 illustrates a diagram describing operation of an example of the micro grid power system.
Figure 6:
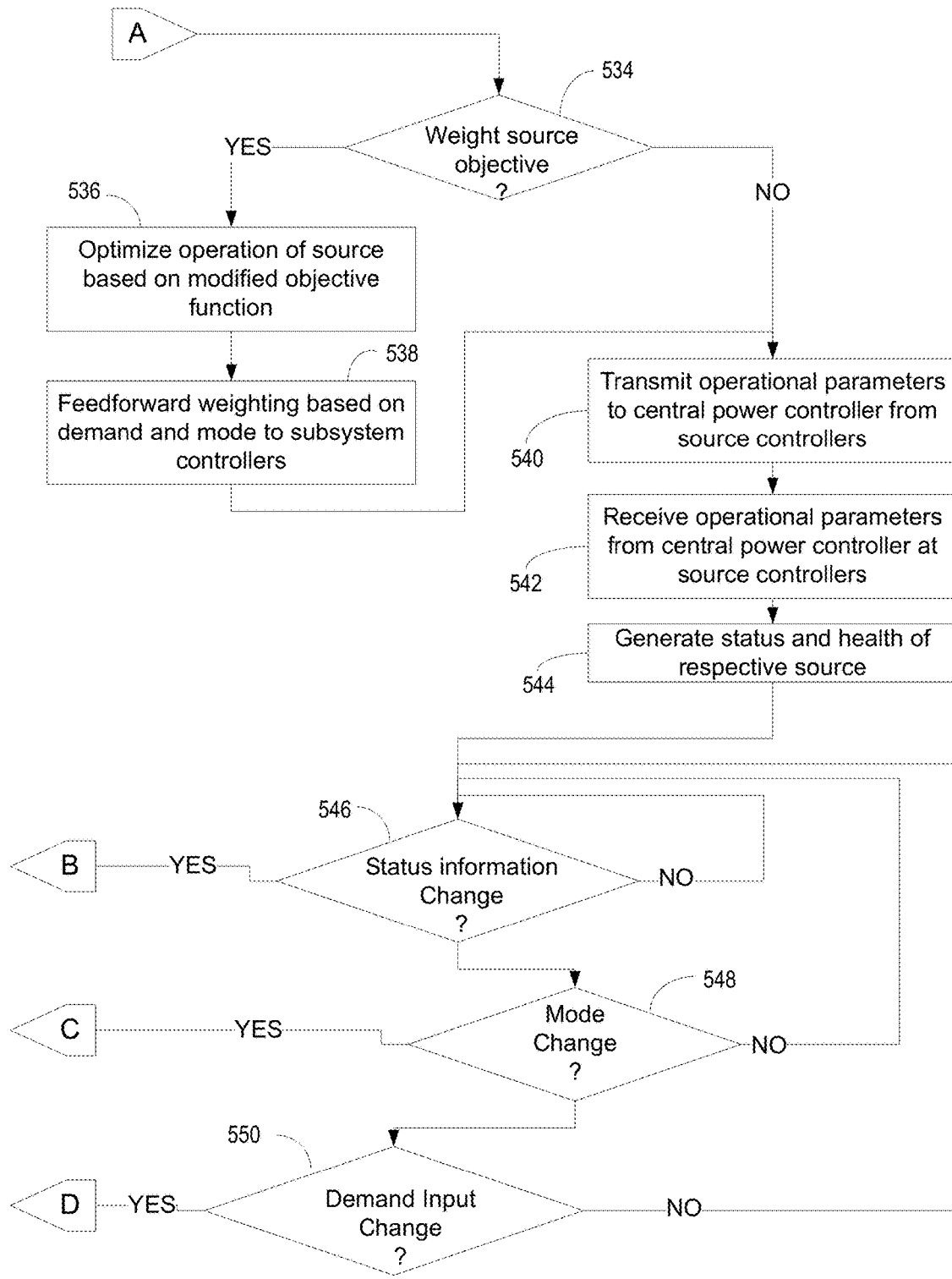
FIG. 6 illustrates an additional part of the operational diagram example illustrated in FIG. 5.

FIG. 5 is a flow diagram illustrating example operation of the micro grid power system 100 as illustrated in FIGS. 1-3. The operation begins with receipt of a demand input to the system controller 102, such as a user input of a system's actual or intended operation. (502) The system controller 102 may determine a mode for the micro grid power system and an objective function by which the system will be optimized. (504) Modeling of sources and parameters with either or both of the system controller 102, and/or source controller 202, may be performed. (506) System optimization may be performed with the system controller 102 by selecting certain of the sources to provide electrical power to the micro grid based on the model(s) developed, the mode of the system, the load of the micro grid and/or the objective function. (508) System optimization (through selection of sources) may be different depending on the mode, the load, and the objective function. For example, when the objective function is economic efficiency, sources with lower operating costs may be selected, whereas if the objective function is longevity of life of the sources, sources with the lowest or slowest reduction in life during operation may be selected.

The system controller 102 may determine whether to request modeling from the source controllers 202 with a model request signal 308. (512) Modeling may be requested due to a system event, such as a change in mode of the micro grid power system, a change in operating conditions, a change in load, or any other situation or activity effecting operation of the system. If a model is requested, the central power controller may selectively output mode request signals 308 to some or all or all of the source controllers 202. (514) In response to the receipt of a model request signal 308, the respective source controller 202 may perform source modeling with the source modeling circuitry 228 and provide a model reference state trajectory or estimate of projected operation. (516) The model reference state trajectory or estimate of projected operation may be provided as the modeled reference state signal 322 to the central power controller 106 for use in performing modeling of the sources and parameters (506).

If the system controller 102 does not request modeling from the source controller, the central power controller 106 may dynamically generate power demand signals 302 to each of the source controllers 202. (520) The power demand signals 302 may be independent and autonomous for each source and be a demand for zero power output, partial rated power output, or full rated power output of a respective source. The demand signals 302 may be unitless gradient signals, such as a percentage, or a dollar amount, or from a predetermined range, such that the source controllers 202 may use the respective demand signal 302 received to establish a target output of electric power from the respective source. In addition, the system controller 102 may generate a mode signal 304. (522) The demand signals 302 and the mode signal 304 may be transmitted to the source controllers 202. (524)

The system controller 102 may also control the switching of the central power distribution device 112 so that those sources where power output is expected may be connected to the micro grid 114, or to another source to be recharged, such as an electrical energy storage source 144 or a mechanical energy storage source 140. In an example, switching of the central power distribution device 112 may be dynamically controlled by the system controller 102 to maintain micro grid Bus A 124 and micro grid Bus B within a predetermined voltage and/or current range. Thus, as the load on Bus A 124 and Bus B varies, the voltage and current may vary resulting in dynamic switching of the sources feeding Bus A 124 and Bus B 126.

Upon receipt of the demand signal 302 and the mode 304, the respective source controllers 202 may optimize operation of their respective source to meet the requested demand. (528) Optimization may involve performing model based generation of operation parameters and/or a model reference state estimate of the projected operation of the source. (530) Based on the modeled results, the source controller 202 may optimize operation of the source to meet the source's objective function.

Referring now to FIG. 5, based on the demand signal 302 and the mode signal 304, the source controller 202 may weight the source objective. (534) The weighting may decrease or increase the influence of the source objective on optimizing operation of the source. For example, where the source objective function is fuel efficiency and the mode is full power mode for aircraft takeoff, the source management 226 may weight to minimize the influence of fuel efficiency in order to provide full rated power to accomplish take off. In another example, an electrical energy storage source may have the objective function of avoiding depletion below a predetermined voltage threshold to extend longevity of the source, however, due to the mode being full power mode for aircraft takeoff, the weighting can minimize the objective function such that the source continues to provide full power even though the predetermined voltage threshold is reached. In other examples, other weighting adjustments for other source objective functions are possible.

If the weighting of the source objective is changed, the source management circuitry 226 may optimize operation of the source based on the modified objective function. (536) In addition, source management circuitry 226 may selectively provide a weighting to one or more of the subsystem controllers 232 to correspondingly adjust operation of the subsystems in the source to, for example, minimize the objective of reduced fuel consumption or longevity. (538) Following the weighting adjustments of the subsystem controllers and/or the source objective, the source controller 202 may transmit operational parameters 310, such as actual parameter signals 312, modeled parameter signals 314, and feedback signals 320 to the central power controller 106. (540)

The central power controller 106 may receive and selectively transmit such operational parameters 310 to source controllers 202 so that source controllers 202 may be provided parameters relevant to operation. (542) For example, a parameter signal 308 for an air temperature received by the central power controller 106 from a gas turbine source may be provided to a source controller 202 of an electrical energy storage source so that the temperature effect on the energy storage source can be accounted for during optimization of the energy storage source by the respective source controller 202. The respective source controllers 202 may also generate additional operational parameters 310 such as the status signal 316 and health signal 318. (544) Operational parameters 310 such as the status and health signals 316 and 318 may be generated based on parameter signals 308 received from the central power controller 106.

The central power controller 106 may monitor for changes in the status information. (546) Upon detecting a change, operation of the system may return to operation (506) and perform modeling of sources and parameters and proceed with the other indicated steps. The central power controller 106 may also monitor for possible mode changes. (548) Mode changes may be due to changes in operational conditions in the micro grid system and/or user inputs. Examples of changes in operational conditions include changes in: electrical output power from the sources determined by the power monitoring circuitry 208, and load sensing determined by the load sensing circuitry 210. Changes in operational conditions may also involve changes in the models or model coordination among the various sources. For example, in the case of a turbogenerator being a source, changes in operational conditions that affect the gas turbine and ultimately the generation of power include changes in altitude, airspeed (if it's an aircraft), humidity, temperature. The models may be updated automatically and dynamically to reflect such changes in operational conditions Upon detecting a possible change in mode, the system returns to operation (504) to determine the mode of the system and the objective function and may proceed with the other indicated steps. The central power controller 106 may also monitor for demand input changes. (550) Demand input changes may be determined by the demand input circuitry 212. Upon receipt of a demand input change, the system may return to operation (502) to sense the load and proceed with the other indicated steps.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure relates, among others, to the following aspects:

1. A micro grid control system comprising:
a plurality of sources of electrical energy comprising a generator, a renewable energy source and a stored energy source;
each of the sources of electrical energy comprising a source controller configured to optimize generation of electrical energy according to a source objective independently associated with each of the sources; and
a central power controller configured to receive operational parameters from each of the plurality of sources and selectively and dynamically provide a power demand signal and a mode signal to each of the sources independently, the central power controller further configured to provide electrical energy to a micro grid from any two or more of the sources according to a system objective, the two or more sources operable in accordance with their respective source objective, and based on the power demand signal and the mode signal to supply electrical power to the system power controller for allocation to the micro grid.

2. The micro grid control system of claim 1, wherein the mode signal is output by the system power controller in accordance with the system objective, and the power demand signal is dynamically generated by the central power controller independently and autonomously for each source controller in accordance with system objective.

3. The micro grid control system of claims 1 or 2, wherein the central power controller comprises a central power distribution device comprising a plurality of switches to control the flow of electrical power to the micro grid, the central power controller further configured to selectively open and close the switches to provide electrical power to the micro grid from respective sources.

4. The micro grid control system as in any of claims 1-3, wherein each of the source controllers receives the power demand signal and weights the source objective according to the received power demand signal.

5. The micro grid control system as in any of claims 1-4, wherein each of the source controllers is configured to receive the mode signal and operate the source in a mode corresponding to the mode signal.

6. The micro grid control system as in any of claims 1-5, wherein the central power controller is configured to provide model based performance control to prioritize power demand signals to the plurality of sources in accordance with estimated source performance.

7. The micro grid control system of claim 6, wherein each of the source controllers is configured with model based control to independently manage parameters of the respective source to optimize performance of the respective source.

8. A micro grid control system comprising:
a central power controller configured to control distribution of electrical power to a micro grid;
a plurality of source controllers in communication with the central power controller, each of the source controllers configured to independently control a respective source of electrical power to optimize operation of the respective source;
a central power distribution device configured to selectively provide electrical energy to the micro grid from sources of electrical power in accordance with control signals provided by the central power controller;
the central power controller configured to perform model based status assessments of the sources of electrical power based on status information received from the source controllers and generate a power demand to each of the source controllers in accordance with optimization of distribution of electrical power to the micro grid.

9. The micro grid control system of claim 8, wherein the source controller of each of the sources is further configured to perform a model reference state estimate for the respective source.

10. The micro grid control system of claim 9, wherein the model reference state estimate is provided to the central power controller, and used by the central power controller to perform the model based status assessment.

11. The micro grid control system as in any of claims 8-10, wherein each demand signal output by the system controller is a unit less gradient value representative of a requested level of power output from a respective source.

12. The micro grid control system as in any of claims 8-11, wherein each of the respective source controllers is configured to perform model based parameter generation and generate a model reference state estimate of projected operation of the source based on the generated model based parameter.

13. The micro grid control system as in any of claims 8-12, wherein each of the respective source controllers is configured to optimize operation of the respective source based on a source objective function and a mode signal received from the central power controller, the mode signal indicative of an operational mode of the micro grid control system.

14. The micro grid control system of claim 13, wherein each of the respective source controllers is configured to generate a feed forward weighting, the feed forward weighting based upon at least one of the power demand or the mode signal and being applied to a subsystem controller of a respective source.

15. A method of operating a micro grid control system, the method comprising:
receiving, at a central power controller a system demand input;
sensing, with the central power controller, a load of a micro grid;
determining a mode of operation of the micro grid control system;
performing modeling of operation of sources included in the micro grid power system based on the system demand input, the load, and the mode of operation;
generating a demand signal for each of the sources, the demand signal generated independently and autonomously for each of the sources based on the modeling and an objective function of the micro grid to optimize electric power output to the micro grid from at least two of the sources;
dynamically transmitting a mode signal indicative of the mode of operation and demand signal to each of the respective sources;
independently optimizing, with a source controller of each of the sources, operation of a respective source to generate electric power in response to the demand signal and according to the mode of operation of the micro grid; and
controlling a central power distribution device to selectively allocate electric power from the sources to the micro grid to satisfy the load.

16. The method of claim 15, wherein independently optimizing comprises modeling operation of at least one of operational parameters and a source model reference state with the source controller of each of the sources.

17. The method of claims 15 or 16, further comprising determining the objective function with the central power controller based on the mode of operation of the micro grid control system.

18. The method as in any of claims 15-17, wherein controlling a central power distribution device comprises selectively allocating electric power from at least one of the sources to another of the sources to recharge the another of the sources based on at least one of the system demand input, the load of the micro grid, and the mode of operation.

19. The method as in any of claims 15-18, wherein generating a demand signal for each of the sources comprises selecting only some of sources to generate electric power so that the electric power output is optimized according to the objective function.

20. The method as in any of claims 15-19, wherein the micro grid is a stand-alone isolated power distribution system in which loads within the power distribution system are only supplied power from the sources of electrical power within the system, and the a micro grid is not coupled to or synchronized with a commercial public utility grid distributing power to residential and industrial companies for a fee.

We claim:

1. A micro grid control system comprising:
   a plurality of sources of electrical energy comprising a generator driven by a gas turbine engine, a renewable energy source and a stored energy source;
   each of the sources of electrical energy comprising a source controller configured to optimize generation of electrical energy according to a source objective independently associated with each of the respective sources; and
   a central power controller configured to receive operational parameters from each of the plurality of sources and selectively and dynamically provide a power demand signal and a mode signal to each of the sources independently, the central power controller further configured to provide electrical energy to a micro grid from any two or more of the sources according to a system objective indicated by the mode signal, the two or more sources operable in accordance with their respective source objective, after their respective source objective is independently adjusted by a feed forward weighting, to supply electrical power to the central power controller for allocation to the micro grid, the feed forward weighting determined based on the power demand signal and the mode signal.

2. The micro grid control system of claim 1, wherein the mode signal is output by the system power controller in accordance with the system objective, and the power demand signal is dynamically generated by the central power controller independently and autonomously for each source controller in accordance with the system objective.

3. The micro grid control system of claim 1, wherein the central power controller comprises a central power distribution device comprising a plurality of switches to control the flow of electrical power to the micro grid, the central power controller further configured to selectively open and close the switches to provide electrical power to the micro grid from respective sources.

4. The micro grid control system of claim 1, wherein each of the source controllers is configured to receive the mode signal and operate the source in a mode corresponding to the mode signal.

5. The micro grid control system of claim 1, wherein the central power controller is configured to provide model based performance control to prioritize power demand signals to the plurality of sources in accordance with estimated source performance.

6. The micro grid control system of claim 5, wherein each of the source controllers is configured with model based control to independently manage parameters of the respective source to optimize performance of the respective source.

7. A micro grid control system comprising:
   a central power controller configured to control distribution of electrical power to a micro grid;
   a plurality of source controllers in communication with the central power controller, each of the source controllers configured to independently control a respective source of electrical power to optimize operation of the respective source, the respective source comprising a generator driven by a gas turbine;
   a central power distribution device configured with a plurality of power switches electrically coupled with respective sources of electric power, the power switches selectively closed to provide electrical energy to the micro grid from respective sources of electrical power, include the generator driven by the gas turbine, the plurality of power switches selectively actuated by the central power distribution device in accordance with control signals provided by the central power controller;
   the central power controller configured to perform model based status assessments of the sources of electrical power based on status information received from the source controllers;
   the central power controller further configured to generate a power demand and a mode signal of the micro grid control system to each of the source controllers, and dynamically actuate the power switches via the central power distribution device based on modeled interaction between the sources of electric power when operated in accordance with the power demand and the mode signal to optimize distribution of electrical power to the micro grid.

8. The micro grid control system of claim 7, wherein the source controller of each of the sources is further configured to perform a model reference state estimate for the respective source.

9. The micro grid control system of claim 8, wherein the model reference state estimate is provided to the central power controller, and used by the central power controller to perform the model based status assessment.

10. The micro grid control system of claim 7, wherein each demand signal output by the system controller is a unit less gradient value representative of a requested level of power output from a respective source.

11. The micro grid control system of claim 7, wherein each of the respective source controllers is configured to perform model based parameter generation and generate a model reference state estimate of projected operation of the source based on the generated model based parameter.

12. The micro grid control system of claim 7, wherein each of the respective source controllers is configured to optimize operation of the respective source based on a source objective function and the mode signal received from the central power controller, the mode signal indicative of an operational mode of the micro grid control system.

13. The micro grid control system of claim 12, wherein each of the respective source controllers is configured to generate a feed forward weighting, the feed forward weighting based upon at least one of the power demand or the mode signal and being applied to a subsystem controller of a respective source.

14. A method of operating a micro grid control system, the method comprising:
   receiving, at a central power controller a system demand input;
   sensing, with the central power controller, a load of a micro grid;
   determining a mode of operation of the micro grid control system;
   performing modeling of operation of sources included in the micro grid power system based on the system demand input, the load, and the mode of operation;
   generating a demand signal for each of the sources, the demand signal generated independently and autonomously for each of the sources based on the modeling and an objective function of the micro grid to optimize electric power output to the micro grid from at least two of the sources;
   dynamically transmitting a mode signal indicative of the mode of operation and the demand signal to each of the respective sources;
   independently optimizing, with a source controller of each of the sources, a source objective of a respective source to generate electric power, by independent feed forward weighting of the source objective of each of the sources in response to the demand signal and according to the mode of operation of the micro grid; and
   controlling a central power distribution device to selectively allocate electric power from the sources to the micro grid to satisfy the load.

15. The method of claim 14, wherein independently optimizing comprises modeling operation of at least one of operational parameters and a source model reference state with the source controller of each of the sources.

16. The method of claim 14, further comprising determining the objective function with the central power controller based on the mode of operation of the micro grid control system.

17. The method of claim 14, wherein controlling a central power distribution device comprises selectively allocating electric power from at least one of the sources to another of the sources to recharge the another of the sources based on at least one of the system demand input, the load of the micro grid, and the mode of operation.

18. The method of claim 14, wherein generating a demand signal for each of the sources comprises selecting only some of sources to generate electric power so that the electric power output is optimized according to the objective function.

19. The method of claim 14, wherein the micro grid is a stand-alone isolated power distribution system in which loads within the power distribution system are only supplied power from the sources of electrical power within the system, and the a micro grid is not coupled to or synchronized with a commercial public utility grid distributing power to residential and industrial companies for a fee.

* * * * *